(12) United States Patent
Enomoto (10) Patent No.: US 6,212,018 B1
(45) Date of Patent: Apr. 3, 2001

(54) ZOOM LENS SYSTEM (75) Inventor: Takashi Enomoto, Chiba (JP)

(73) Assignee: Asahi Kogaku Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/348,674

(22) Filed: Jul. 6, 1999

(30) Foreign Application Priority Data

Jul. 7, 1998 (JP) .................................................. 10-191413

(51) Int. Cl.⁷ .................................................. G02B 15/14
(52) U.S. Cl. ......................... 359/692; 359/691; 359/684
(58) Field of Search ................................. 359/692, 691, 359/689, 684

(56) References Cited

U.S. PATENT DOCUMENTS 5,530,589 * 6/1996 Sato ...................................... 359/557
6,061,186 * 5/2000 Nishio .................................. 359/684

FOREIGN PATENT DOCUMENTS 6-265827    9/1994   (JP) .

* cited by examiner

*Primary Examiner*—Georgia Epps
*Assistant Examiner*—Tim Thompson
(74) *Attorney, Agent, or Firm*—Greenblum & Bernstein P.L.C.

(57) ABSTRACT

A zoom lens system including a positive first lens group and a negative second lens group in this order from the object, and in which zooming is performed by varying the distance between the positive first lens group and the negative second lens group; wherein a diaphragm is positioned between lens elements which constitute the first lens group, and wherein focusing is performed by moving the negative second lens group along the optical axis.

11 Claims, 13 Drawing Sheets

Fig. 4A
FNO=4.0

—— d Line
---- g Line
--- C Line

-0.5    0.5

SPHERICAL
ABERRATION
CHROMATIC
ABERRATION

LATERAL
CHROMATIC
ABERRATION

ASTIGMATISM

DISTORTION

Fig. 5A
FNO=4.7

Fig. 6A
FNO=6.7

Fig. 9A 
FNO=6.7
-0.5  0.5
SPHERICAL ABERRATION
CHROMATIC ABERRATION
— d Line
----- g Line
--- C Line

Fig. 9B 
Y=34.85
-0.05  0.05
LATERAL CHROMATIC ABERRATION

Fig. 9C 
Y=34.85
-0.5  0.5
ASTIGMATISM
— S
-- M

Fig. 9D 
Y=34.85
-5.0 (%) 5.0
DISTORTION

Fig.10

Fig.11A FNO=4.0
Fig.11B W=36.3°
Fig.11C W=36.3°
Fig.11D W=36.3°

— d Line
······ g Line
--- C Line

— S
-- M

-0.5  0.5
SPHERICAL ABERRATION
CHROMATIC ABERRATION

-0.05  0.05
LATERAL CHROMATIC ABERRATION

-0.5  0.5
ASTIGMATISM

-5.0 (%) 5.0
DISTORTION

Fig.12A
FNO=4.7

—— d Line
----- g Line
— — C Line

— S
-- M

-0.5    0.5
SPHERICAL
ABERRATION
CHROMATIC
ABERRATION

-0.05    0.05
LATERAL
CHROMATIC
ABERRATION

-0.5    0.5
ASTIGMATISM

-5.0 (%) 5.0
DISTORTION

Fig.13A
FNO=6.7

—— d Line
----- g Line
— — C Line

— S
-- M

-0.5    0.5
SPHERICAL
ABERRATION
CHROMATIC
ABERRATION

-0.05    0.05
LATERAL
CHROMATIC
ABERRATION

-0.5    0.5
ASTIGMATISM

-5.0 (%) 5.0
DISTORTION

Fig.14A FNO=4.0 — SPHERICAL ABERRATION CHROMATIC ABERRATION

Fig.14B Y=34.85 — LATERAL CHROMATIC ABERRATION

Fig.14C Y=34.85 — ASTIGMATISM

Fig.14D Y=34.85 — DISTORTION

Fig.15A FNO=4.7 — SPHERICAL ABERRATION CHROMATIC ABERRATION

Fig.15B Y=34.85 — LATERAL CHROMATIC ABERRATION

Fig.15C Y=34.85 — ASTIGMATISM

Fig.15D Y=34.85 — DISTORTION

FNO=3.7

-0.5   0.5

SPHERICAL
ABERRATION

CHROMATIC
ABERRATION

——— d Line
········· g Line
- - - - C Line

-0.05   0.05

LATERAL
CHROMATIC
ABERRATION

ASTIGMATISM

DISTORTION

Fig.19A
FNO=4.6

-0.5   0.5

SPHERICAL
ABERRATION

CHROMATIC
ABERRATION

— d Line
----- g Line
--- C Line

LATERAL
CHROMATIC
ABERRATION

ASTIGMATISM

DISTORTION

Fig.20A
FNO=6.7

-0.5   0.5

SPHERICAL
ABERRATION

CHROMATIC
ABERRATION

— d Line
----- g Line
--- C Line

LATERAL
CHROMATIC
ABERRATION

ASTIGMATISM

DISTORTION

Fig.21A
FNO=3.7

SPHERICAL
ABERRATION

CHROMATIC
ABERRATION

Fig.21B
Y=34.85

LATERAL
CHROMATIC
ABERRATION

Fig.21C
Y=34.85

ASTIGMATISM

Fig.21D
Y=34.85

DISTORTION

Fig.22A
FNO=4.6

SPHERICAL
ABERRATION

CHROMATIC
ABERRATION

Fig.22B
Y=34.85

LATERAL
CHROMATIC
ABERRATION

Fig.22C
Y=34.85

ASTIGMATISM

Fig.22D
Y=34.85

DISTORTION

Fig.23A
FNO=6.7

— d Line
----- g Line
—-— C Line

-0.5   0.5

SPHERICAL
ABERRATION

CHROMATIC
ABERRATION

LATERAL
CHROMATIC
ABERRATION

ASTIGMATISM

DISTORTION

ZOOM LENS SYSTEM

BACKGROUND OF THE INVENTION

1. Field of the Invention

The present invention relates to a zoom lens system in which a back focal distance can be short.

2. Description of the Related Art

In a zoom lens system for a single lens reflex (SLR) camera, in order to have a space behind the photographing lens system, a retrofocus type lens systems, which includes negative first lens group (a front lens group) and a positive second lens groups (a rear lens group) in this order from an object, is generally employed so that a longer back focal distance can be provided. On the other hand, in a zoom lens system in which a back focal distance can be short (e.g., a zoom lens system in a compact camera), since there is no need to provide a longer back focal distance unlike a zoom lens system for a single lens reflex (SLR) camera, a telephoto type lens system, which includes a positive first lens group (a front lens group) and a negative lens group (a real lens group) in this order from the object, is generally employed. Because the two-lens-group zoom lens system is employed, the number of lens elements are fewer, simplification of the structure is attained, the manufacturing costs can be reduced, and the miniaturization of the lens system can be achieved.

Along with the popularization of compact cameras, not only the correcting of aberrations but also an increase of relative brightness (a smaller F-number) is required in the zoom lens system of a compact camera. In a two-lens-group zoom lens system, in order to satisfactorily correct aberrations from the short focal length extremity toward the long focal length extremity, it is necessary to correct aberrations in each lens group. However, the smaller the F-number is, the more difficult the correcting of aberrations in each lens group becomes. In particular, for correcting aberrations in the front lens group, the number of lens elements thereof have to be increased. Due to the increase of the lens elements, two major structural problems arise.

The first problem is that when the F-number is smaller the diameter of the shutter has to be made larger whereby the shutter unit itself has inevitably to be made larger. In a two-lens-group zoom lens system which performs zooming by varying the distance between the positive front lens group and the negative rear lens group, conventionally the diaphragm is provided between the front and rear lens groups from a structural point of view. However, if the above explained large-sized shutter unit as a result of a smaller F-number is positioned between the front and rear lens groups, there is a possibility that the large-sized shutter unit interferes with the rear lens group. In particular, in a collapsible barrel type zoom lens system with the large sized shutter unit, when the lens barrel is being collapsed, the front and rear lens groups cannot adequately approach each other, and the collapsed barrel length is increased. The overall thickness of the camera is then increased.

The second problem is that an increase of burden on the focusing mechanism due to an increase of the lens elements in the front lens group, which is attributable to a small F-number. Conventionally, in the two-lens-group zoom lens system which performs zooming by varying the distance between the positive front lens group and the negative rear lens group, focusing is generally performed by driving the entire front lens group. However, if the entire front lens group having an increased weight due to the increased lens elements as a result of a smaller F-number is to be driven, the focusing mechanism has to be enlarged, which hinders the miniaturization of a camera.

SUMMARY OF THE INVENTION

It is an object of the present invention to provide a two-lens-group zoom lens system for a compact camera, which can eliminate an adverse influence on the collapsed length of the lens system even when a relative brightness is increased (a smaller F-number), and can reduce the burden on the focusing mechanism.

It is noted that the present invention is created based on the following conceptions:

(1) In a two-lens-group zoom lens system, when the number of lens elements in the front lens group is increased for the purpose of obtaining a smaller F-number, it is possible to have a space, within the front lens group, for providing the diaphragm; and (2) The burden on the focusing mechanism is reduced, if focusing is designed to be performed by the rear lens group which is not required to increase the number of lens elements for the purpose of obtaining a smaller F-number.

In order to achieve the above-mentioned object, there is provided a zoom lens system including a positive first lens group and a negative second lens group in this order from the object, and in which zooming is performed by varying the distance between the positive first lens group and the negative second lens group; wherein a diaphragm is provided within the positive first lens group, and wherein focusing is performed by moving the negative second lens group along the optical axis.

The first lens group preferably includes more than seven lens elements, and the diaphragm is positioned between the two of the lens elements, which can form the longest distance therebetween.

When the present invention is applied to a zoom lens system having the half angle-of-view of more than 30° at the short focal length extremity, the zoom lens system preferably satisfies the following conditions:

$$0.7 < \Sigma d_s / \Sigma d_{1G} < 1 \quad (1)$$

$$0.6 < H_1/H_s < 0.9 \quad (2)$$

wherein:

$\Sigma d_{1G}$ designates the distance from the most object-side surface of the most image-side surface of the first lens group;

$\Sigma d_s$ designates the distance from the most object-side surface to the diaphragm of the first lens group;

$h_1$ designates the height of the paraxial ray which strikes the most object-side surface of the first lens group at the short focal length extremity; and $H_s$ designates the height of the paraxial ray at the position of the diaphragm when the first lens group is at the short focal length extremity.

The zoom lens system preferably satisfies the following condition:

$$-1.5 < f_w/f_F < -1.3 \quad (3)$$

wherein:

$f_w$ designates the focal length of the entire zoom lens system at the short focal length extremity; and $f_F$ designates the focal length of the second lens group.

The present disclosure relates to subject matter contained in Japanese Patent Application No. 10-191413 (filed on Jul. 7, 1998) which is expressly incorporated herein by reference in its entirety.

BRIEF DESCRIPTION OF THE DRAWINGS

The invention will be discussed below in detail with reference to the accompanying drawings, in which.

DESCRIPTION OF THE PREFERRED EMBODIMENT

Figure 1:
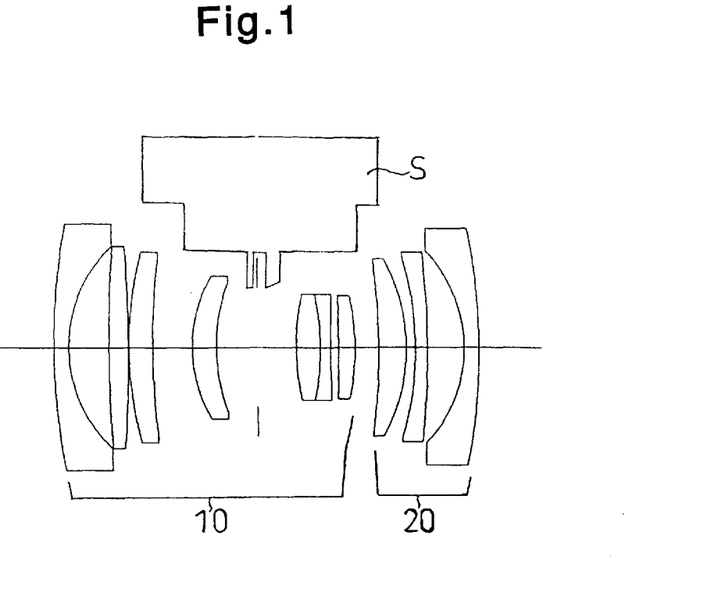
FIG. 1 is a lens arrangement of a zoom lens system according to the present invention.
Figure 2:
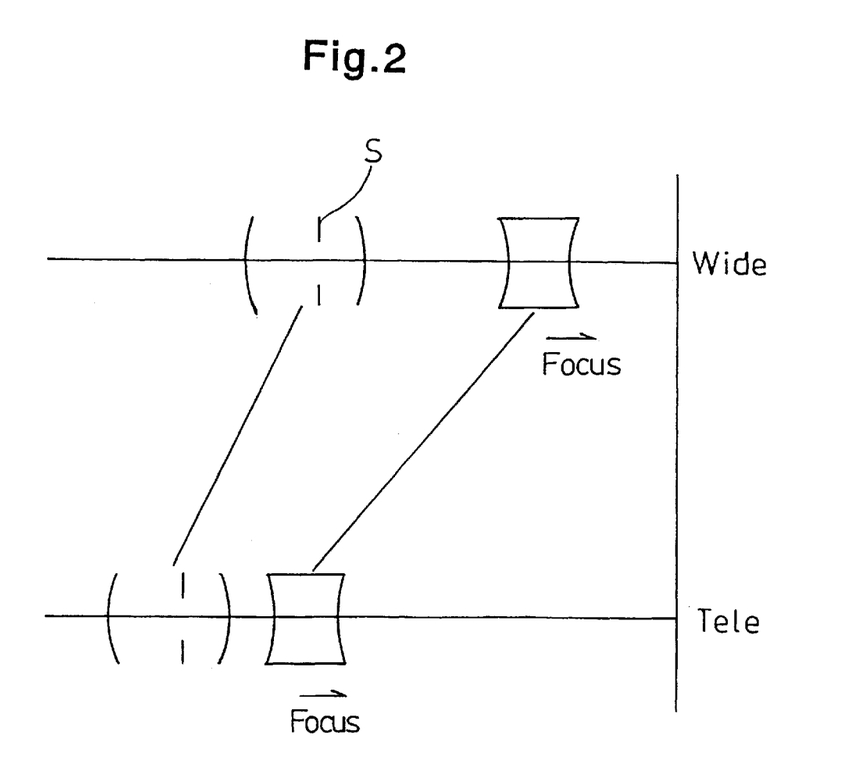
FIG. 2 shows the traveling paths of the lens groups for zooming and focusing according to the present invention.

The zoom lens system, as shown in FIGS. 1 and 2, includes a positive first lens group (front lens group) 10 and a negative second lens group (rear leans group) 20 in that order from the object. A diaphragm (shutter unit) S is provided in the first lens group 10. More concretely, the diaphragm S is positioned between lens elements which constitute the first lens group 10. In this zoom lens system, at the time of zooming from the short focal length extremity toward the long focal length extremity, the distance between the first lens group 10 and the second lens group 20 is reduced while the both lens groups move toward the object. Focusing is performed by moving the second lens group 20 along the optical axis.

With respect to one of the explained two major problems, that is, the first problem in which when the F-number is smaller the diameter of the shutter has to be made larger whereby the shutter unit itself has inevitably to be made larger. It should be noted that positioning the diaphragm (shutter unit) S between lens elements in the positive first lens group 10 is a countermeasure to cope with the first problem. Due to this arrangement, when the lens barrel is being collapsed, interference of the diaphragm S and the second lens group 20 is prevented, and the front lens group 10 and rear lens group 20 can adequately approach each other to the point where an increase of the collapsed barrel length is prevented (i.e., the collapsed length can be shortened).

With respect to the other major problem, that is, the second problem in which an increase of burden on the focusing mechanism due to an increase of the lens elements in the front lens group, which is attributable to a smaller F-number. It should be noted that performing focusing through the second lens group 20 is a countermeasure to cope with the second problem. Due to this arrangement, as focusing is performed through the second lens group 20 which is not influenced by a smaller F-number and is lightweight with a smaller number of the lens elements, the burden on the focusing mechanism can be reduced.

Furthermore, in order to satisfy recent requirements of a wider angle-of-view at the short focal length extremity, conditions (1) and (2) are provided under the condition that a half angle-of-view at the short focal length extremity exceeds 30°.

Condition (1) specifies the position of the diaphragm in the positive first lens group. By satisfying condition (1), interference of the diaphragm unit and a member in the camera body can be prevented, and adverse influence on the collapsed barrel length can be eliminated (i.e., the collapsed length can be shortened), and peripheral illumination at the short focal length extremity can be maintained.

If $\Sigma d_s/\Sigma d_{1G}$ exceeds the lower limit of condition (1), in order to maintain peripheral illumination at a wide angle position covering the half angle-of-view of more than 30°, the rear lens group has to be made too large. On the other hand, if $\Sigma d_s/\Sigma d_{1G}$ exceeds the upper limit of condition (1), the rear lens group cannot adequately move backwards, and the collapsed length has to be increased.

Condition (2) specifies the height of the paraxial ray at the position of the diaphragm. By satisfying condition (2), a wide angle covering the half angle-of-view of more than 30° at the short focal length extremity can be attained, and aberrations can adequately be corrected.

If $H_1/H_s$ exceeds the lower limit of condition (2), a wide angle covering the half angle-of-view of more than 30° at the short focal length extremity cannot be attained. On the other hand, if $H_1/H_s$ exceeds the upper limit of condition (2), the power of the positive first lens group becomes strong, so that the correcting of aberrations is difficult.

Furthermore, a preferable condition to use the negative second lens group as s focusing lens group is provided by condition (3).

Condition (3) specifies the power of the focusing lens group (the negative second lens group). By satisfying condition (3), precision of focusing can be obtained, and the diameter of the focusing lens group can be reduced.

If $f_w/f_F$ exceeds the upper limit of condition (3), the moving distance of the focusing lens group during focusing is made longer, so that the diameter of the focusing lens group becomes too large in order to maintain peripheral illumination at the time of the moving. If $f_w/f_F$ exceeds the lower limit of condition (3), the power of the focusing lens group becomes strong, whereby aberrations are increased. Furthermore, the sensitivity of the focusing lens group becomes too high, whereby precision of focusing is lowered.

Specific numerical data of the embodiments will be described below via the tables and diagrams. $F_{NO}$ designates the F-number, f designates the focal length, W designates the half angle-of-view, M designates the lateral magnification, Y designates the image height, and $f_B$ designates the back focal distance. R designates the radius of curvature of each lens surface, D designates the lens thickness or distance, $N_d$ designates refractive index with respect to the d-line, and $v_d$ designates the Abbe number. In the diagrams of chromatic aberration represented by spherical aberration, the solid lines and the two types of dotted lines respectively indicate spherical aberrations with respect to the d, g and C lines. Also, in the diagrams of lateral chromatic aberration, the solid lines and the two types of dotted lines respectively indicate magnification with respect to the d, g and c lines. S designates the sagittal image plane, and M designates the meridional image plane.

In addition to the above, an aspherical surface which is symmetrical with respect to the optical axis is defined as follows:

$$x=Ch^2/\{1+[1-(1+K)C^2h^2]^{1/2}\}+A4h^4+A6h^6+A8h^8+A10h^{10}\ldots,$$

wherein:

x designates a distance from a tangent plane of an aspherical vertex;

C designates a curvature of the aspherical vertex (1/R);

h designates a distance from the optical axis;

K designates the conic coefficient;

A4 designates a fourth-order aspherical coefficient;

A6 designates a sixth-order aspherical coefficient;

A8 designates a eighth-order aspherical coefficient;

A10 designates a tenth-order aspherical coefficient.

First Embodiment

Figure 3:
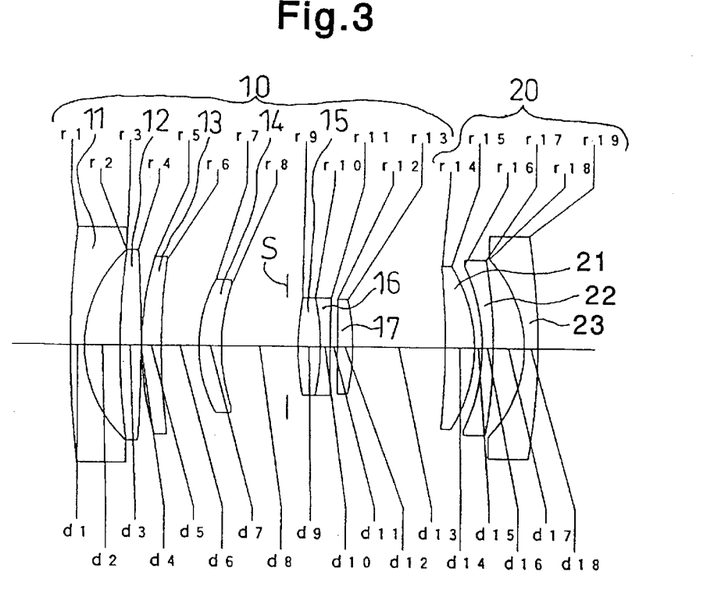
FIG. 3 is a lens arrangement of the first embodiment of a zoom lens system, according to the present invention, at the long focal length extremity.
Figures 4A, 4B:
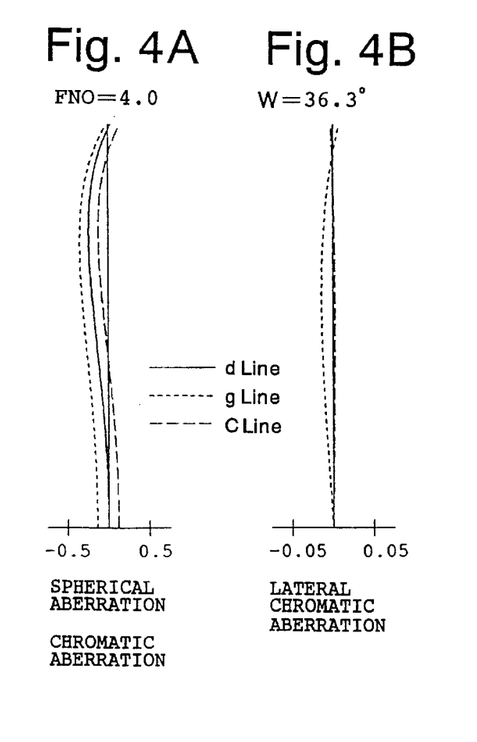
FIGS. 4A, 4B, 4C and 4D are aberration diagrams, at the short focal length extremity, of the zoom lens system of FIG. 1 focused on an object at infinity.
Figure 4C:
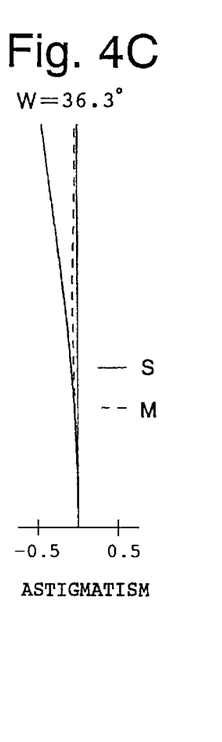
Figure 4D:
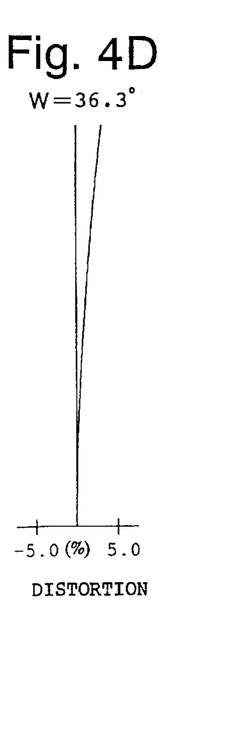
Figure 5A:
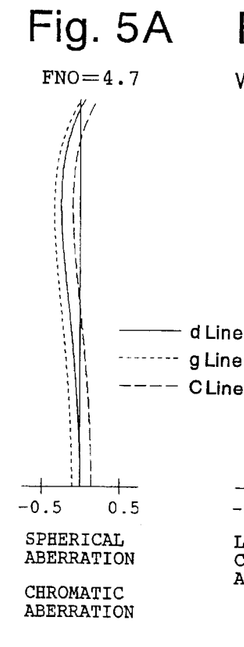
FIGS. 5A, 5B, 5C and 5D are aberration diagrams, at a medium focal-length position, of the zoom lens system of FIG. 1 focused on an object at infinity.
Figure 5B:
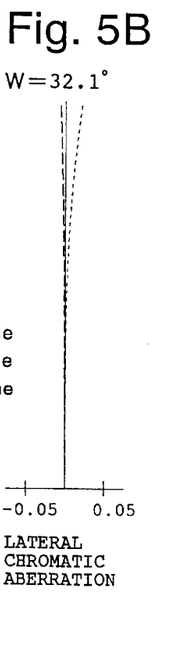
Figure 5C:
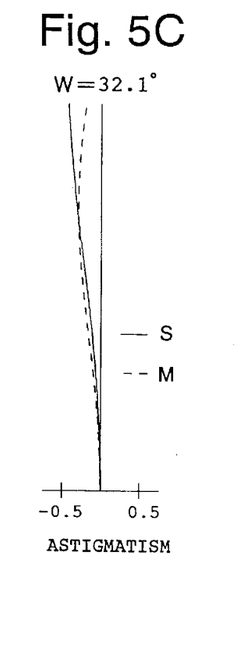
Figure 5D:
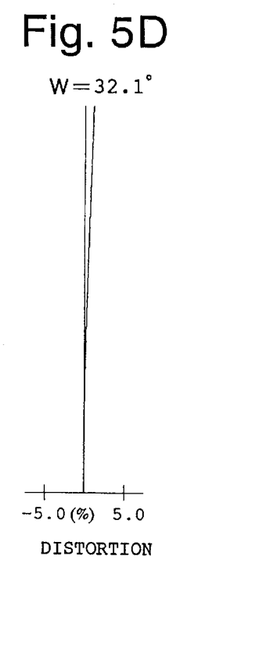
Figure 6A:
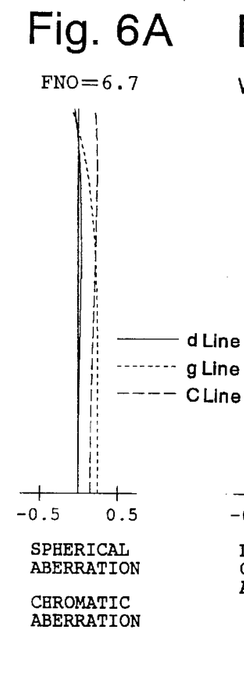
FIGS. 6A, 6B, 6C and 6D are aberration diagrams, at the long focal length extremity, of the zoom lens system of FIG. 1 focused on an object at infinity.
Figure 6B:
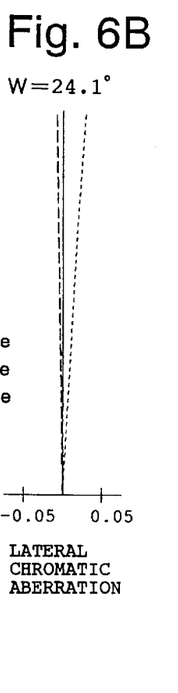
Figure 6C:
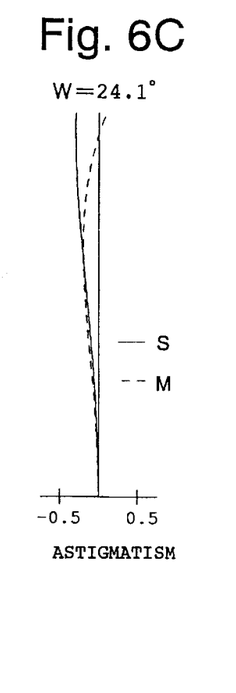
Figure 6D:
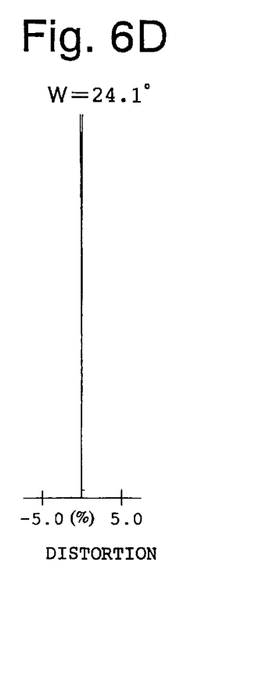
Figures 7A, 7B:
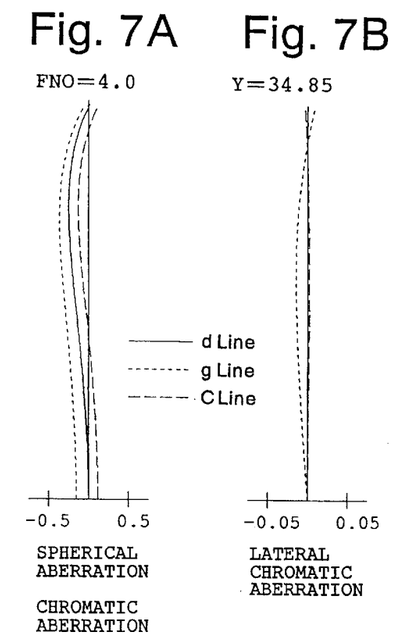
FIGS. 7A, 7B, 7C and 7D are aberration diagrams, at the short focal length extremity, of the zoom lens system of FIG. 1 focused on an object positioned at a finite distance.
Figure 7C:
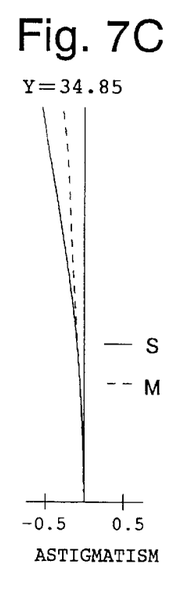
Figure 7D:
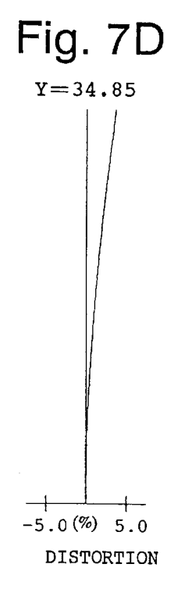
Figures 8A, 8B:
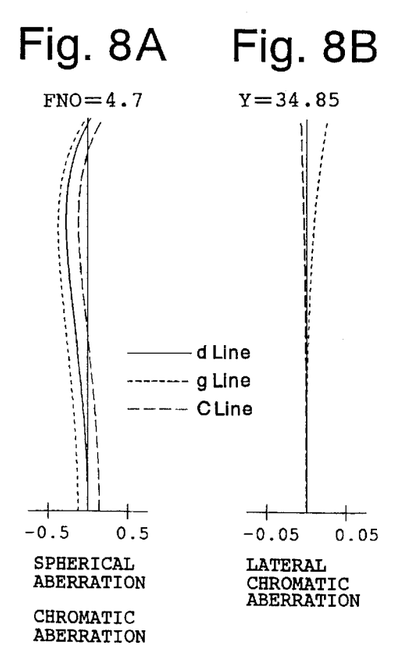
FIGS. 8A, 8B, 8C and 8D are aberration diagrams, at a medium focal-length position, of the zoom lens system of FIG. 1 focused on an object positioned at a finite distance.
Figure 8C:
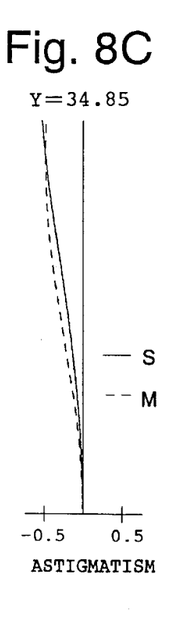
Figure 8D:
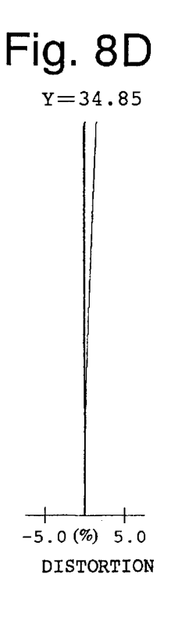
Figures 9A, 9B, 9C:
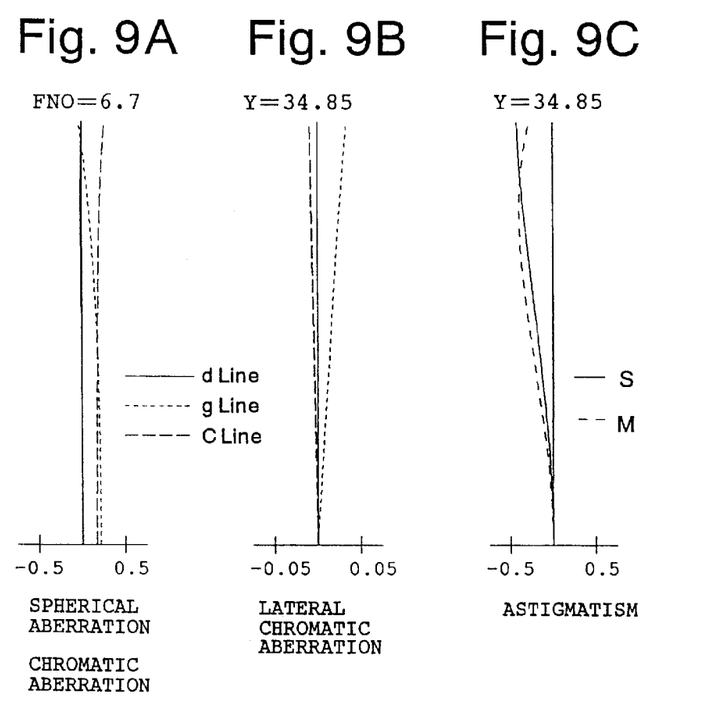
FIGS. 9A, 9B, 9C and 9D are aberration diagrams, at the long focal length extremity, of the zoom lens system of FIG. 1 focused on an object positioned at a finite distance.
Figure 9D:
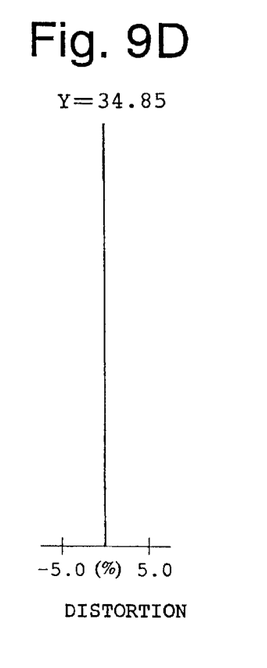

FIGS. 3 through 9D show the first embodiment of the zoom lens system, and FIG. 3 is a lens arrangement thereof. The zoom lens system includes a positive first lens group 10 and a negative second lens group 20, in this order from the object. The first lens group 10 includes a negative meniscus lens element 11, a positive lens element 12, a positive lens element 13 having the convex surface on the object side, a positive lens element 14 having the convex surface on the object side, a diaphragm (shutter unit) S, a cemented sub lens group including a positive biconvex lens element 15 and a negative lens element 16 having the concave surface on the object side, and a positive lens element 17 having the convex and aspherical surface on the image side, in this order from the object. The second lens group 20 includes a positive lens element 21 having the convex surface on the image side, a negative meniscus lens element 22 having the concave surface on the object side, and a negative meniscus lens element 23 having the concave surface on the object side, in this order from the object. FIGS. 4A through 4D, 5A through 5D, and 6A through 6D are aberration diagrams, respectively at the short focal length extremity, a medium focal length position, and the long focal length extremity, of the zoom lens system focused on an object at infinity. FIGS. 7A through 7D, 8A through 8D, and 9A through 9D, are aberration diagrams, respectively at the short focal length extremity, a medium focal length position, and the long focal length extremity, of the zoom lens system focused on an object positioned at a finite distance (distance between the object and the image: u=2.45 m). Table 1 shows the numerical data thereof.

TABLE 1

$F_{NO}$ = 4.0 ~4.7 ~6.7
f = 46.00 ~55.00 ~78.00 (zoom ratio: 1.70)
W = 36.3° ~32.1° ~24.1° (infinite object distance; hereinafter, infinite)
M = −0.019 ~−0.023 ~−0.033 (finite object distance; hereinafter finite)
$f_B$ = 17.68 ~28.51 ~56.18 (infinite)
$f_B$ = 16.92 ~27.90 ~55.69 (finite)

| Surface No. | R | D | Nd | vd |
|---|---|---|---|---|
| 1 | 145.229 | 2.00 | 1.58695 | 64.6 |
| 2 | 18.750 | 5.07 | — | — |
| 3 | 100.000 | 3.00 | 1.49000 | 69.8 |
| 4 | −223.666 | 0.10 | — | — |
| 5 | 43.878 | 2.80 | 1.51434 | 65.9 |
| 6 | 93.004 | 5.36 | — | — |
| 7 | 20.247 | 3.20 | 1.62195 | 49.2 |
| 8 | 27.408 | 9.39 | — | — |
| Diaphragm | ∞ | 1.50 | — | — |
| 9 | 35.140 | 3.18 | 1.51633 | 64.1 |
| 10 | −33.981 | 1.40 | 1.80518 | 25.4 |
| 11 | 239.617 | 1.00 | — | — |
| 12 | 649.000 | 2.20 | 1.73077 | 40.5 |
| 13* | −30.650 | 13.45 ~9.30 ~3.05 (infinite) 14.21 ~9.91 ~3.54 (finite) | — | — |
| 14 | −120.844 | 4.23 | 1.60188 | 38.2 |
| 15 | −22.059 | 1.12 | — | — |
| 16 | −27.940 | 1.60 | 1.78000 | 51.9 |
| 17 | −72.435 | 4.53 | — | — |
| 18 | −18.321 | 2.00 | 1.77250 | 49.6 |
| 19 | −93.983 | — | — | — |

*designates the aspherical surface which is symmetrical with respect to the optical axis.

Aspherical surface data (the aspherical surface coefficients not indicated are zero (0.00)):

No.13: K=0.00, A4=0.1267×10$^{-4}$, A6=0.3698×10$^{-7}$, A8=0.1141×10$^{-9}$.

Second Embodiment

Figure 10:
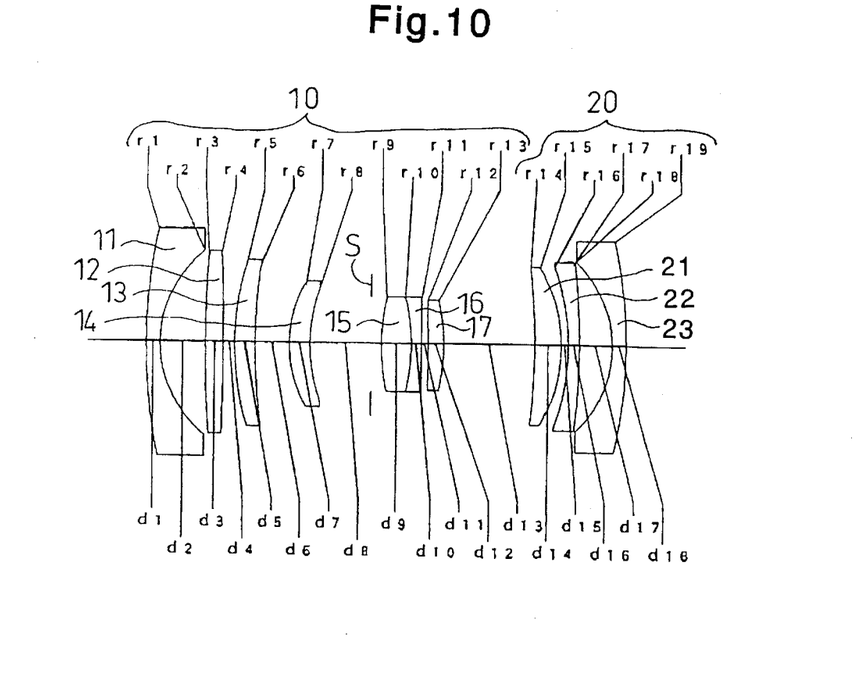
FIG. 10 a lens arrangement of the second embodiment of a zoom lens system, according to the present invention, at the long focal length extremity.
Figures 11A, 11B:
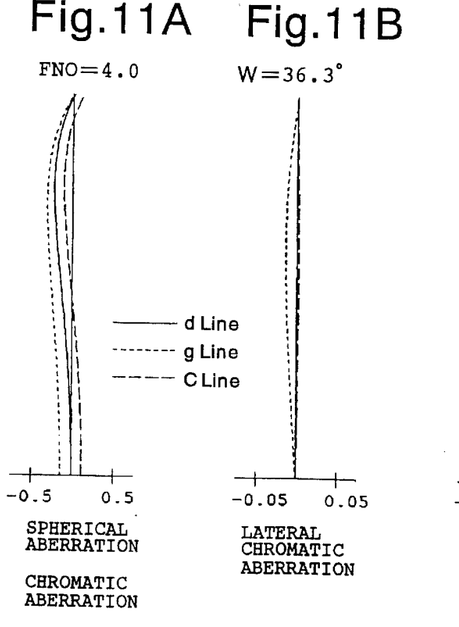
FIGS. 11A, 11B, 11C and 11D are aberration diagrams, at the short focal length extremity, of the zoom lens system of FIG. 10 focused on an object at infinity.
Figure 11C:
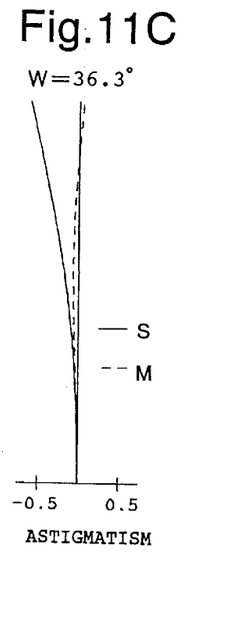
Figure 11D:
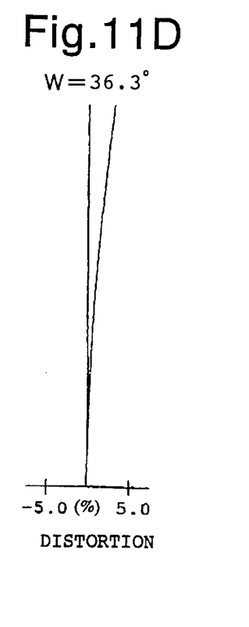
Figure 12A:
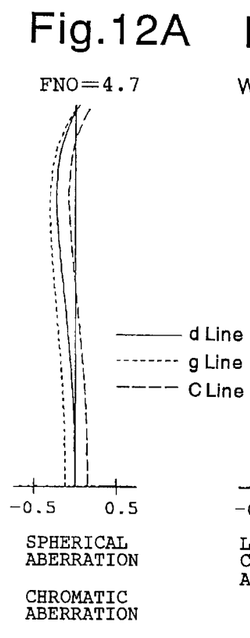
FIGS. 12A, 12B, 12C and 12D are aberration diagrams, at medium focal-length position, of the zoom lenses system of FIG. 10 focused on an object at infinity.
Figure 12B:
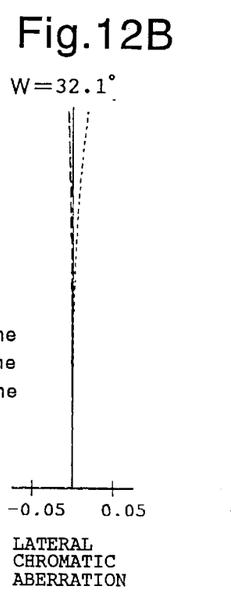
Figure 12C:
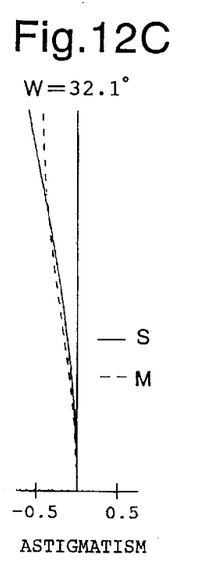
Figure 12D:
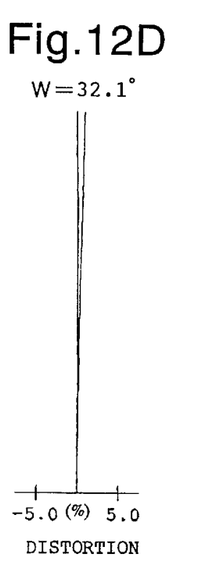
Figure 13A:
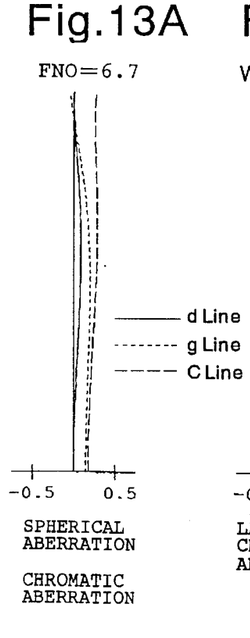
FIGS. 13A, 13B, 13C and 13D are aberration diagrams, at the long focal length extremity, of the zoom lens system of FIG. 10 focused on an object at infinity.
Figure 13B:
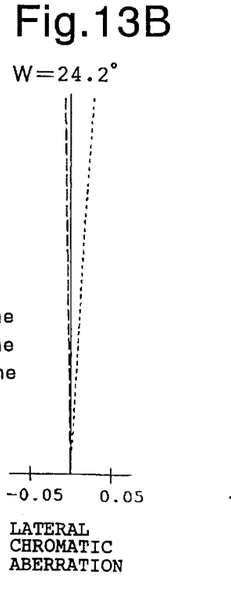
Figure 13C:
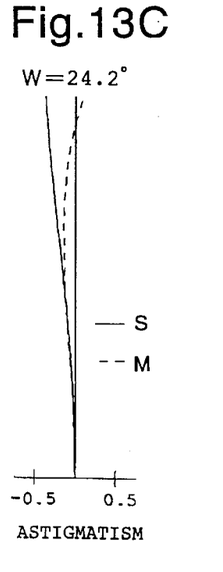
Figure 13D:
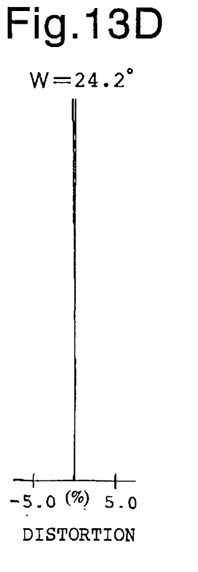
Figures 14A, 14B:
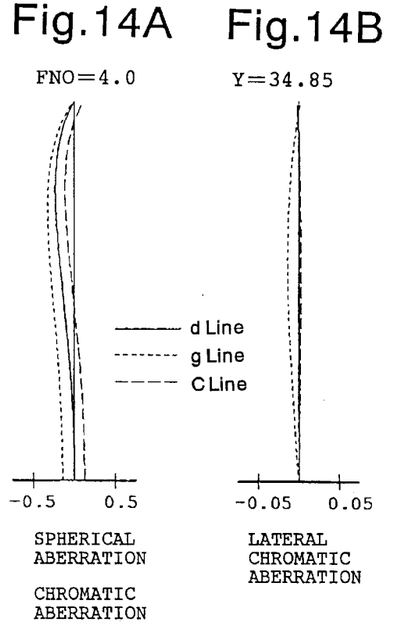
FIGS. 14A, 14B, 14C and 14D are aberration diagrams, at the short focal length extremity, of the zoom lens system of FIG. 10 focused on an object positioned at a finite distance.
Figure 14C:
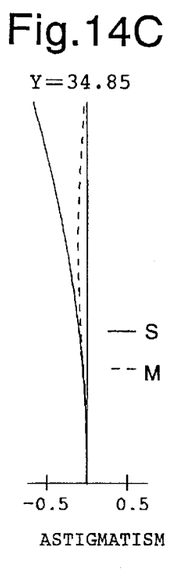
Figure 14D:
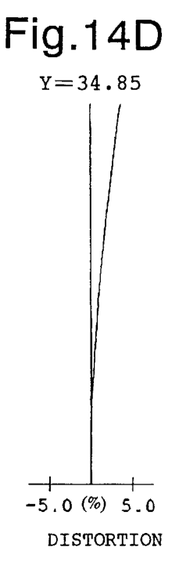
Figures 15A, 15B:
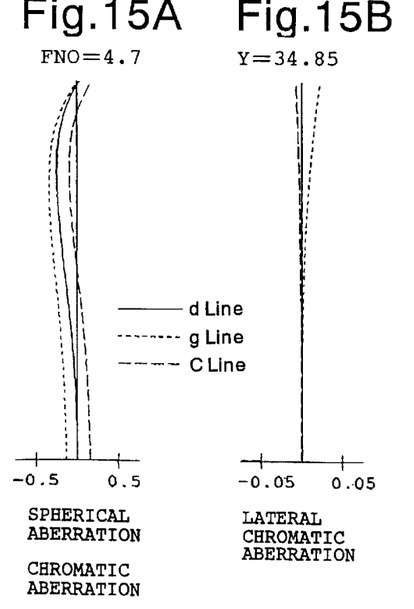
FIGS. 15A, 15B, 15C and 15D are aberration diagrams, at a medium focal-length position, of the zoom lens system of FIG. 10 focused on an object positioned at a finite distance.
Figure 15C:
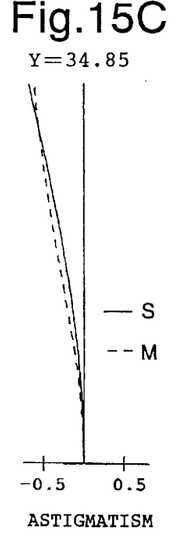
Figure 15D:
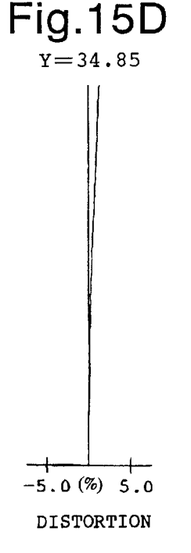
Figures 16A, 16B:
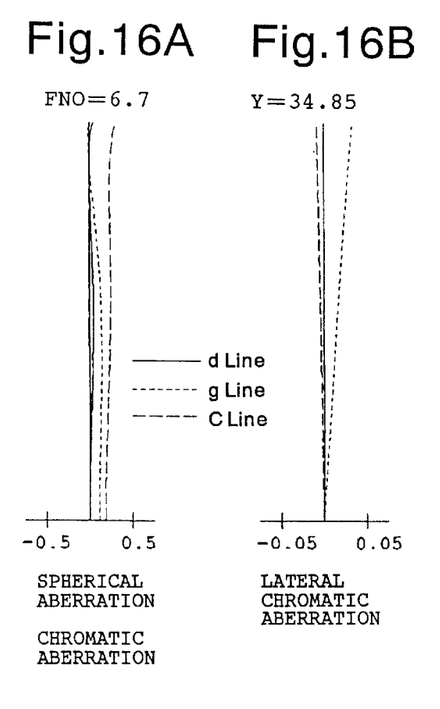
FIGS. 16A, 16B, 16C and 16D are aberration diagrams, at the long focal length extremity, of the zoom lens system of FIG. 10 focused on an object positioned at a finite distance.
Figure 16C:
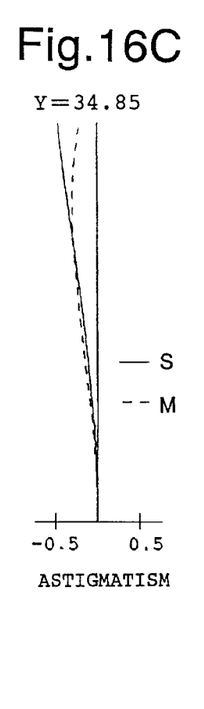
Figure 16D:
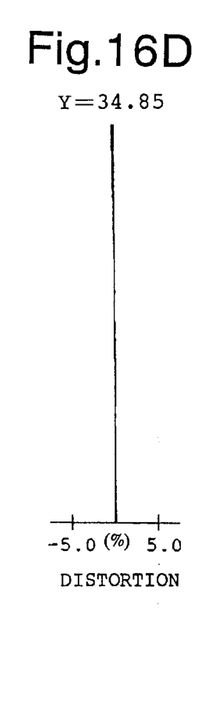

FIGS. 10 through 16D show the second embodiment of the zoom lens system, and FIG. 10 is a lens arrangement thereof. The zoom lens system includes a positive first lens group 10 and a negative second lens group 20, in this order from the object. The first lens group 10 includes a negative meniscus lens element 11, a positive lens element 12, a positive lens element 13 having the convex surface on the object side, a positive lens element 14 having the convex surface on the object side, a diaphragm (shutter unit) S, a cemented sub lens group including a positive biconvex lens element 15 and a negative lens element 16 having the concave surface on the object side, and a positive lens element 17 having the convex and aspherical surface on the image side, in this order from the object. The second lens group 20 includes a positive lens element 21 having the convex surface on the image side, a negative meniscus lens element 22 having the concave surface on the object side, and a negative meniscus lens element 23 having the concave surface on the object side, in this order from the object. FIGS. 11A through 11D, 12A through 12D, and 13A through 13D are aberration diagrams, respectively at the short focal length extremity, a medium focal length position, and the long focal length extremity, of the zoom lens system focused on an object at infinity. FIGS. 14A through 14D, 15A through 15D, and 16A through 16D, are aberration diagrams, respectively at the short focal length extremity, a medium focal length position, and the long focal length extremity, of the zoom lens system focused on an object positioned at a finite distance (distance between the object and the image: u=2.45 m). Table 2 shows the numerical data thereof.

TABLE 2

$F_{NO}$ = 4.0 ~4.7 ~6.7
f = 46.00 ~55.00 ~78.00 (zoom ratio: 1.70)
W = 36.3° ~32.1° ~24.2° (infinite)
M = −0.019 −−0.023 −−0.033 (finite)
$f_B$ = 18.63 −30.33 −60.22 (infinite)
$f_B$ = 17.83 ~29.70 ~59.71 (finite)

| Surface No. | R | D | Nd | vd |
|---|---|---|---|---|
| 1 | 88.699 | 2.00 | 1.60232 | 62.9 |
| 2 | 18.750 | 6.41 | — | — |
| 3 | 183.000 | 2.60 | 1.49000 | 69.8 |
| 4 | −356.636 | 1.63 | — | — |
| 5 | 46.709 | 2.90 | 1.62856 | 54.5 |
| 6 | 96.903 | 4.93 | — | — |
| 7 | 19.522 | 3.00 | 1.67610 | 51.7 |
| 8 | 26.100 | 8.71 | — | — |
| Diaphragm | ∞ | 1.52 | — | — |
| 9 | 33.429 | 4.26 | 1.51633 | 64.1 |
| 10 | −31.236 | 1.40 | 1.80518 | 25.4 |
| 11 | 714.430 | 1.00 | — | — |
| 12 | −315.457 | 2.20 | 1.73077 | 40.5 |
| 13* | −31.281 | 13.08 ~8.49 ~1.58 (infinite) 13.88 ~9.12 ~2.09 (finite) | — | — |
| 14 | −102.437 | 3.80 | 1.62516 | 35.6 |
| 15 | −24.253 | 1.00 | — | — |
| 16 | −37.406 | 1.60 | 1.77913 | 52.0 |
| 17 | −116.511 | 4.72 | — | — |
| 18 | −18.335 | 2.00 | 1.77250 | 49.6 |
| 19 | −75.376 | — | — | — |

*designates the aspherical surface which is symmetrical with respect to the optical axis.

Aspherical surface data (the aspherical surface coefficients not indicated are zero (0.00)):
No.13:K=0.00, A4=0.1586×10⁻⁴, A6=0.2594×10⁻⁷, A8=0.2678×10⁻⁹.

Third Embodiment

Figure 17:
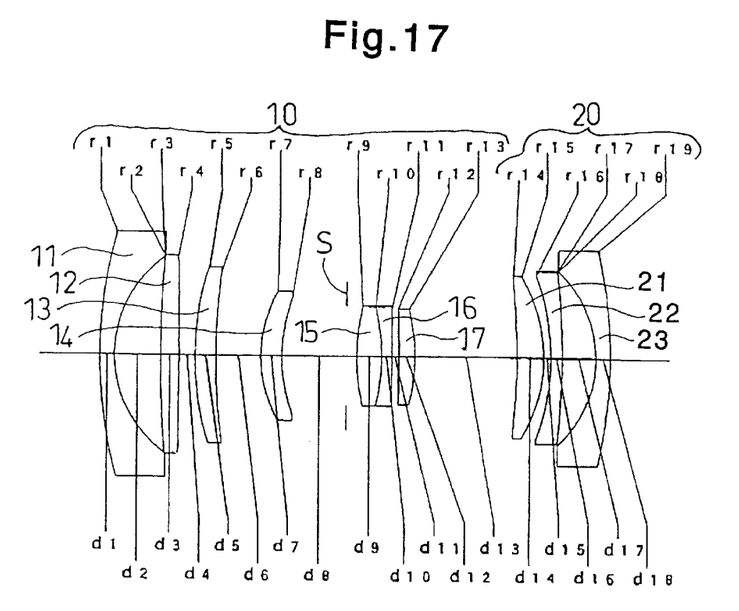
FIG. 17 is a lens arrangement of the third embodiment of a zoom lens system, according to the present invention, at the long focal length extremity.
Figures 18A, 18B:
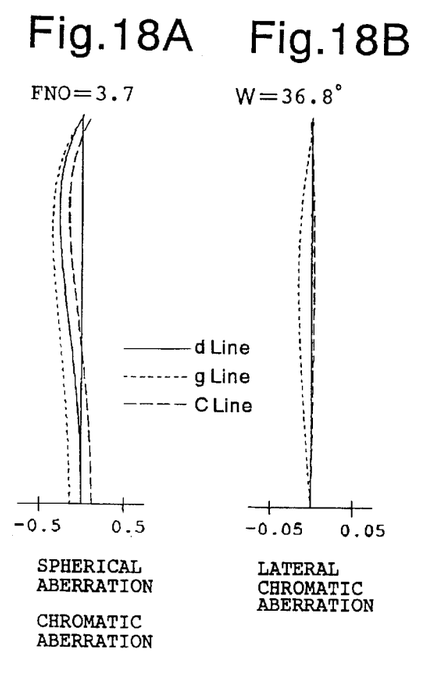
FIGS. 18A, 18B, 18C and 18D are aberration diagrams, at the short focal length extremity, of the zoom lens system of FIG. 17 focused on an object at infinity.
Figure 18C:
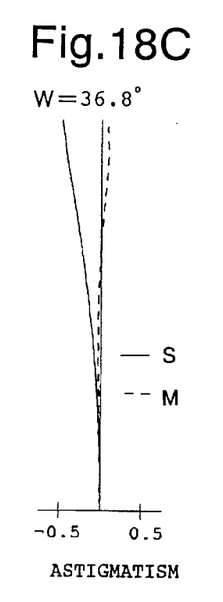
Figure 18D:
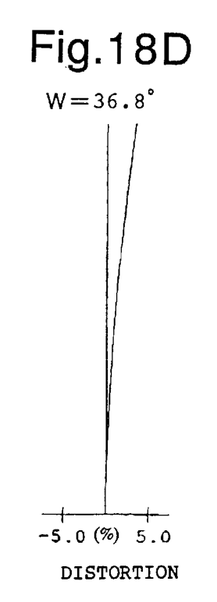
Figure 19A:
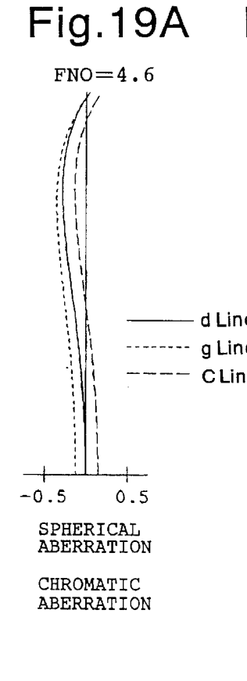
FIGS. 19A, 19B, 19C and 19D are aberration diagrams, at a medium focal-length position, of the zoom lens system of FIG. 17 focused on an object at infinity.
Figure 19B:
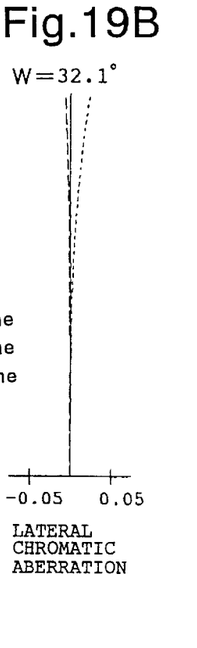
Figure 19C:
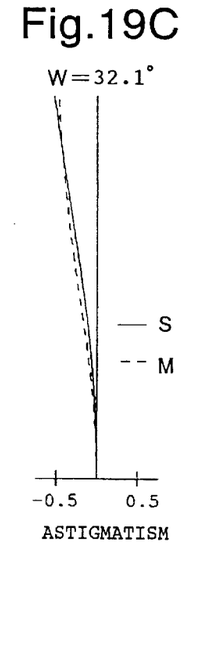
Figure 19D:
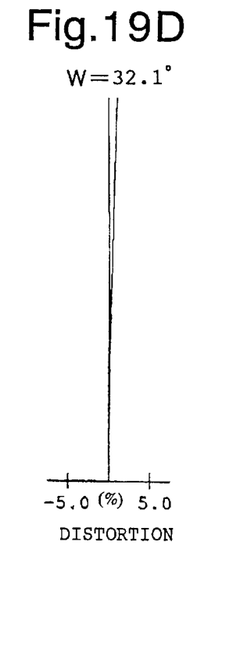
Figure 20A:
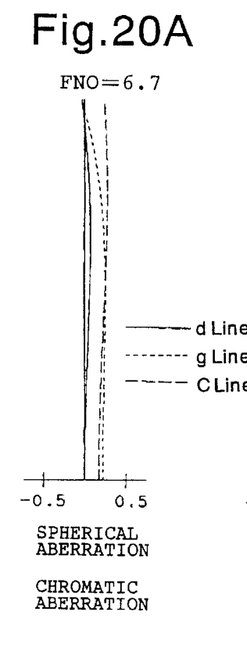
FIGS. 20A, 20B, 20C and 20D are aberration diagrams, at the long focal length extremity, of the zoom lens system of FIG. 17 focused on an object at infinity.
Figure 20B:
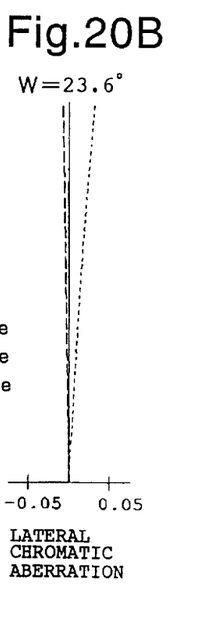
Figure 20C:
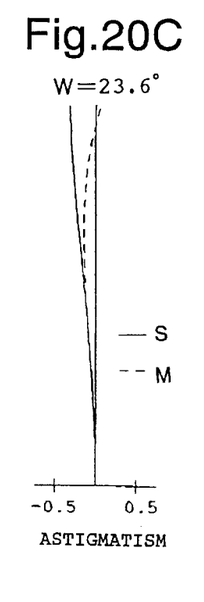
Figure 20D:
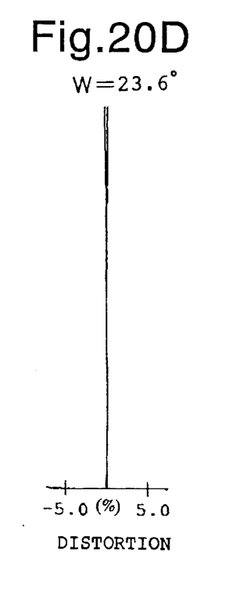
Figures 21A, 21B:
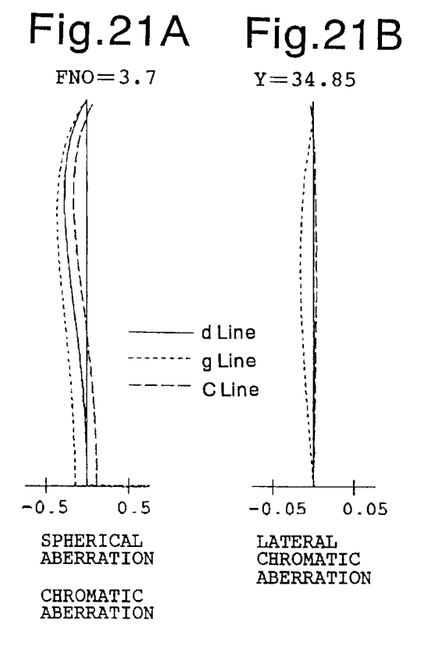
FIGS. 21A, 21B, 21C and 21D are aberration diagrams, at the short focal length extremity, of the zoom lens system of FIG. 17 focused on an object positioned at a finite distance.
Figure 21C:
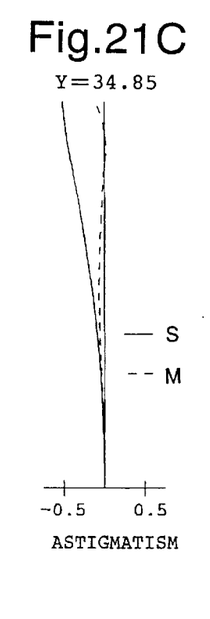
Figure 21D:
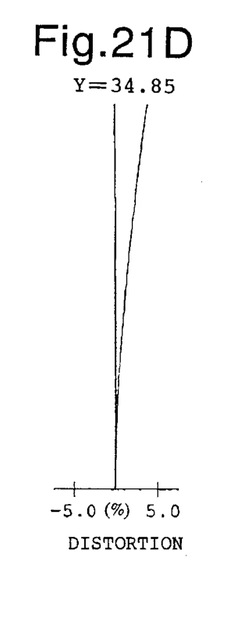
Figures 22A, 22B:
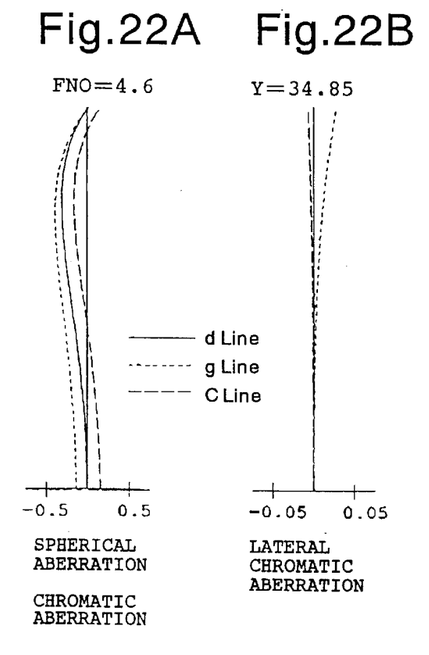
FIGS. 22A, 22B, 22C and 22D are aberration diagrams, at a medium focal-length position, of the zoom lens system of FIG. 17 focused on an object positioned at a finite distance.
Figure 22C:
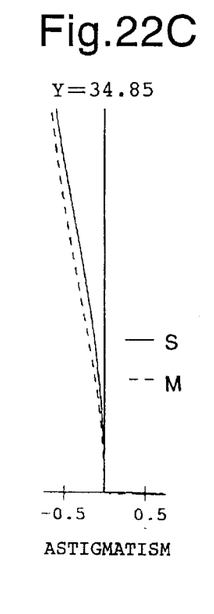
Figure 22D:
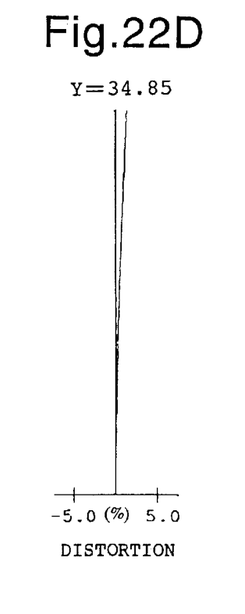
Figure 23A:
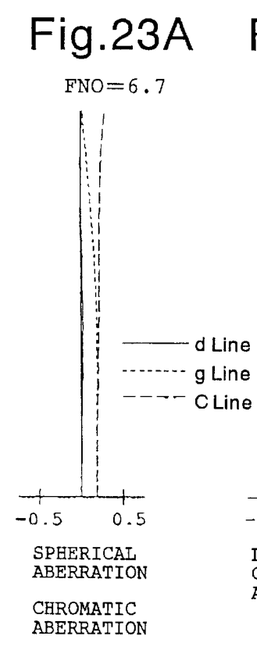
FIGS. 23A, 23B, 23C and 23D are aberration diagrams, at the long focal length extremity, of the zoom lens system of FIG. 17 focused on an object positioned at a finite distance.
Figure 23B:
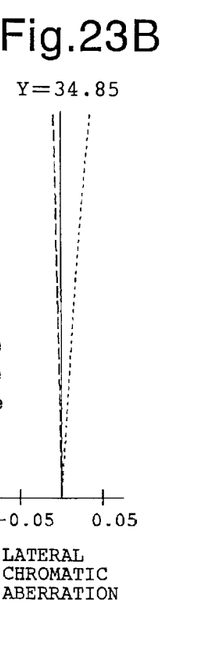
Figure 23C:
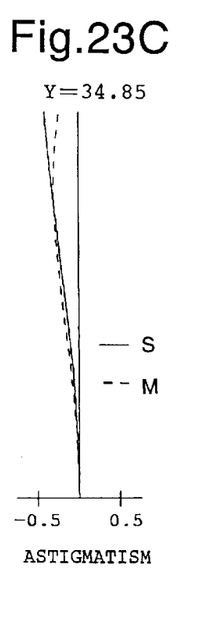
Figure 23D:
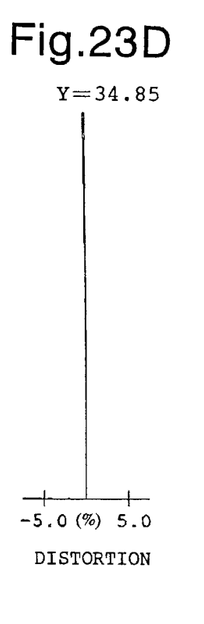

FIGS. 17 through 23D show the third embodiment of the zoom lens system, and FIG. 17 is a lens arrangement thereof. The zoom lens system includes a positive first lens group 10 and a negative second lens group 20, in this order from the object. The first lens group 10 includes a negative meniscus lens element 11, a positive lens element 12, a positive lens element 13 having the convex surface on the object side, a positive lens element 14 having the convex surface on the object side, a diaphragm (shutter unit) S, a cemented sub lens group including a positive biconvex lens element 15 and a negative lens element 16 having the concave surface on the object side, and a positive lens element 17 having the convex and aspherical surface on the image side, in this order from the object. The second lens group 20 includes a positive lens element 21 having the convex surface on the image side, a negative meniscus lens element 22 having the concave surface on the object side, and a negative meniscus lens element 23 having the concave surface on the object side, in this order from the object. FIGS. 18A through 18D, 19A through 19D, and 20A through 20D are aberration diagrams, respectively at the short focal length extremity, a medium focal length position, and the long focal length extremity, of the zoom lens system focused on an object at infinity. FIGS. 21A through 21D, 22A through 22D, and 23A through 23D, are aberration diagrams, respectively at the short focal length extremity, a medium focal length position, and the long focal length extremity, of the zoom lens system focused on an object positioned at a finite distance (distance between the object and the image: u=2.45 m). Table 3 shows the numerical data thereof.

TABLE 3

$F_{NO}$ = 3.7 −4.6 −6.7
f = 45.00 ~55.00 ~80.00 (zoom ratio: 1.70)
W = 36.8° ~32.1° ~23.6° (infinite)
M = −0.019 −−0.023 −−0.034 (finite)
$f_B$ = 17.22 ~30.05 ~62.11 (infinite)
$f_B$ = 16.40 −29.43 −61.61 (finite)

| Surface No. | R | D | Nd | vd |
|---|---|---|---|---|
| 1 | 72.601 | 2.00 | 1.58939 | 64.3 |
| 2 | 18.757 | 6.43 | — | — |
| 3 | 184.923 | 2.60 | 1.49000 | 69.8 |
| 4 | −740.971 | 2.19 | — | — |
| 5 | 46.445 | 2.90 | 1.57999 | 58.2 |
| 6 | 96.021 | 6.36 | — | — |
| 7 | 19.788 | 3.00 | 1.66487 | 49.4 |
| 8 | 26.141 | 9.02 | — | — |
| Diaphragm | ∞ | 1.50 | — | — |
| 9 | 33.215 | 3.44 | 1.51633 | 64.1 |
| 10 | −31.886 | 1.40 | 1.80518 | 25.4 |
| 11 | 700.056 | 1.00 | — | — |
| 12 | −312.703 | 2.20 | 1.73077 | 40.5 |
| 13* | −31.528 | 14.29 −9.20 −2.04 (infinite) 15.11 ~9.82 ~2.54 (finite) | — | — |
| 14 | −108.171 | 3.80 | 1.62101 | 36.0 |
| 15 | −24.160 | 1.00 | — | — |
| 16 | −36.266 | 1.60 | 1.78000 | 51.9 |
| 17 | −116.511 | 4.73 | — | — |
| 18 | −18.318 | 2.00 | 1.77250 | 49.6 |
| 19 | −75.376 | — | — | — |

* designates the aspherical surface which is symmetrical with respect to the optical axis.

Aspherical surface data (the aspherical surface coefficients not indicated are zero (0.00)):
No.13:K=0.00, A4=0.1489×10⁻⁴, A6=0.3057×10⁻⁷, A8=0.1462×10⁻⁹.

Table 4 shows the numerical values which correspond to each condition of embodiments 1 through 3.

TABLE 4

| | Embodiment 1 | Embodiment 2 | Embodiment 3 |
|---|---|---|---|
| Condition (1) | 0.77 | 0.77 | 0.79 |
| Condition (2) | 0.83 | 0.89 | 0.89 |
| Condition (3) | −1.23 | −1.12 | −1.12 |

As can be understood from Table 4, the numerical values of embodiments 1 through 3 satisfy conditions (1) through (3).

According to a two-lens-group zoom lens system, for a compact camera, of the present invention, an adverse influence on the collapsed length of the lens system can be eliminated even when a relative brightness is increased (a smaller F-number), and the burden on the focusing mechanism can be reduced.

What is claimed is:

1. A zoom lens system comprising a positive first lens group and a negative second lens group in this order from the object, and in which zooming is performed by varying the distance between said positive first lens group and said negative second lens group;

wherein a diaphragm is positioned between lens elements which constitute said first lens group, wherein focusing is performed by moving said negative second lens group along the optical axis, and wherein said zoom lens has a half angle-of-view of more than 30° at a short focal length extremity, and wherein said zoom lens system satisfies the following condition:

$$0.7<\Sigma d_s/\Sigma d_{1G}<1$$

$$0.6<H_1/H_s<0.9$$

wherein:

$\Sigma d_{1G}$ represents the distance from the most object-side surface to the most image-side surface of said first lens group;

$\Sigma d_s$ represents the distance from the most object-side surface to the diaphragm of the first lens group;

$H_1$ represents the height of a paraxial ray which strikes the most object-side surface of said first lens group at the short focal length extremity; and $H_s$ represents the height of the paraxial ray at the position of said diaphragm when said first lens group is at the short focal length extremity.

2. A zoom lens system comprising a positive first lens group and a negative second lens group in this order from the object, and in which zooming is performed by varying the distance between said positive first lens group and said negative second lens group;

wherein a diaphragm is positioned between lens elements which constitute said first lens group, wherein focusing is performed by moving said negative second lens group along an optical axis, and wherein said zoom lens system satisfies the following condition:

$$-1.23 \leq f_w/f_F<1.0$$

wherein:

$f_w$ designates a focal length of the entire zoom lens system at the short focal length extremity; and $f_F$ designates the focal length of said second lens group.

3. The zoom lens system according to claim 1, wherein said zoom lens system satisfies the following condition:

$$-1.5<f_w/f_F<-1.0$$

wherein:

$f_w$ designates the focal length of the entire zoom lens system at the short focal length extremity; and $f_F$ designates the focal length of said second lens group.

4. A zoom lens system consisting of:

a positive first lens group and a negative second lens group in this order from an object, zooming being performed by varying a distance between said first lens group and said second lens group, a frontmost lens element of said positive first lens group comprising a negative meniscus lens element;

a diaphragm positioned between lens elements of said first lens group; and focusing being performed by movement of said negative second lens group along an optical axis.

5. The zoom lens system according to claim 4, wherein said zoom lens system has a half angle-of-view of more than 30° at a short focal length extremity.

6. The zoom lens system according to claim 5, wherein said zoom lens system satisfies the following relationship:

$$0.7<\Sigma d_s/\Sigma d_{1G}<1$$

wherein:

$\Sigma d_{1G}$ represents a distance from the most object-side surface to the most image-side surface of said first lens group; and $\Sigma d_s$ represents a distance from the most object-side surface to the diaphragm of said first lens group.

7. The zoom lens system according to claim 5, wherein said zoom lens system satisfies the following condition:

$$0.6<H_1/H_s<0.9$$

wherein:

$H_1$ represents a height of a paraxial ray which strikes the most object-side surface of said first lens group at the short focal length extremity; and $H_s$ represents the height of the paraxial ray at the position of said diaphragm when said first lens group is at the short focal length extremity.

8. The zoom lens system according to claim 4, wherein said zoom lens system satisfies the following relationship:

$$-1.5<f_w/f_F<-1.0$$

wherein:

$F_w$ represents a focal length of the entire zoom lens system at the short focal length extremity; and $f_F$ represents the focal length of said second lens group.

9. The zoom lens system according to claim 1, wherein during zooming from the short focal length extremity towards the long focal length extremity, the distance between the first lens group and the second lens group decreases as both lens groups move towards the object.

10. The zoom lens system according to claim 2, wherein during zooming from the short focal length extremity towards the long focal length extremity, the distance between the first lens group and the second lens group decreases as both lens gorups move towards the object.

11. The zoom lens system according to claim 4, wherein during zooming from the short focal length extremity towards the long focal length extremity, the distance between the first lens group and the second lens group decreases as both lens groups move towards the object.

* * * * *

UNITED STATES PATENT AND TRADEMARK OFFICE
CERTIFICATE OF CORRECTION

PATENT NO. : 6,212,018 B1
DATED : April 3, 2001
INVENTOR(S) : Takashi Enomoto

It is certified that error appears in the above-identified patent and that said Letters Patent is hereby corrected as shown below:

Title page,
Item (73), Assignee: "Asahi Kogaku Kabushik Kaishai, Tokyo (JP)" should be
-- Asahi Kogaku Kogyo Kabushiki Kaisha, Tokyo (JP) --

Signed and Sealed this

Twenty-eighth Day of August, 2001

Attest:

NICHOLAS P. GODICI
Attesting Officer    Acting Director of the United States Patent and Trademark Office